United States Patent [19]

Larkin

[11] 4,420,657
[45] Dec. 13, 1983

[54] ADJUSTABLE HEADSET

[75] Inventor: Wallace K. Larkin, Scotts Valley, Calif.

[73] Assignee: ACS Communications, Inc., Scotts Valley, Calif.

[21] Appl. No.: 316,230

[22] Filed: Oct. 29, 1981

[51] Int. Cl.³ .................. H04R 23/00; H04M 1/03; H04M 1/04
[52] U.S. Cl. ................ 179/156 A; 179/156 R; 179/102; 179/182 R; 179/107 R; 181/129; 181/132
[58] Field of Search .............. 179/102, 182 R, 107 E, 179/156 A, 156 R, 149, 151, 107 S, 107 R, 146 R, 153, 154, 156 R, 182 A, 157; 174/35 R, 102 C, 103; 128/151; 2/259, 183, 209; 181/129, 132, 135, 136, 133; D24/67; 435/351, 89; 248/200, 214

[56] References Cited

U.S. PATENT DOCUMENTS

| 2,025,398 | 12/1935 | Pocock et al. | 179/156 A |
| 2,954,442 | 9/1960 | Mickenberg | 179/156 R |
| 3,184,556 | 5/1965 | Larkin | 179/156 A |
| 3,588,384 | 6/1971 | Negley | 179/156 R |
| 3,645,354 | 2/1972 | Kliewer | 179/182 R |
| 3,894,172 | 7/1975 | Jachinowicz et al. | 174/103 X |
| 4,090,042 | 5/1978 | Larkin | 179/156 A |
| 4,302,635 | 11/1981 | Jacobsen et al. | 179/182 R X |

FOREIGN PATENT DOCUMENTS 2351504  5/1975  Fed. Rep. of Germany ... 179/156 A

OTHER PUBLICATIONS

"Stereo Catalog 1981" (published by Ziff Davis) Oct. 1980, p. 198.

Primary Examiner—G. Z. Rubinson
Assistant Examiner—Danita R. Byrd
Attorney, Agent, or Firm—Limbach, Limbach & Sutton

[57] ABSTRACT

A lightweight adjustable headset is disclosed for use with telephones. The headset includes a housing having a microphone boom mounted in a manner to permit rotational and translational movement. A support member is provided for affixing the headset to the wearer. In one embodiment of the subject invention, which includes a wire headband for support, a cushion is affixed to the housing and is adapted to rest against the ear of the wearer. The cushion is configured such that it functions as a load bearing support and as a pivot point to permit the adjustment of the position of the headset relative to the user's head. In addition, the cushion functions to reduce the likelihood of infections and for dissipating sound surges. In an alternate embodiment of the subject invention, the support member includes a clip to permit the mounting of the headset to the frame of the pair of eyeglasses. The subject clip is capable of gripping temples of various thicknesses.

18 Claims, 11 Drawing Figures

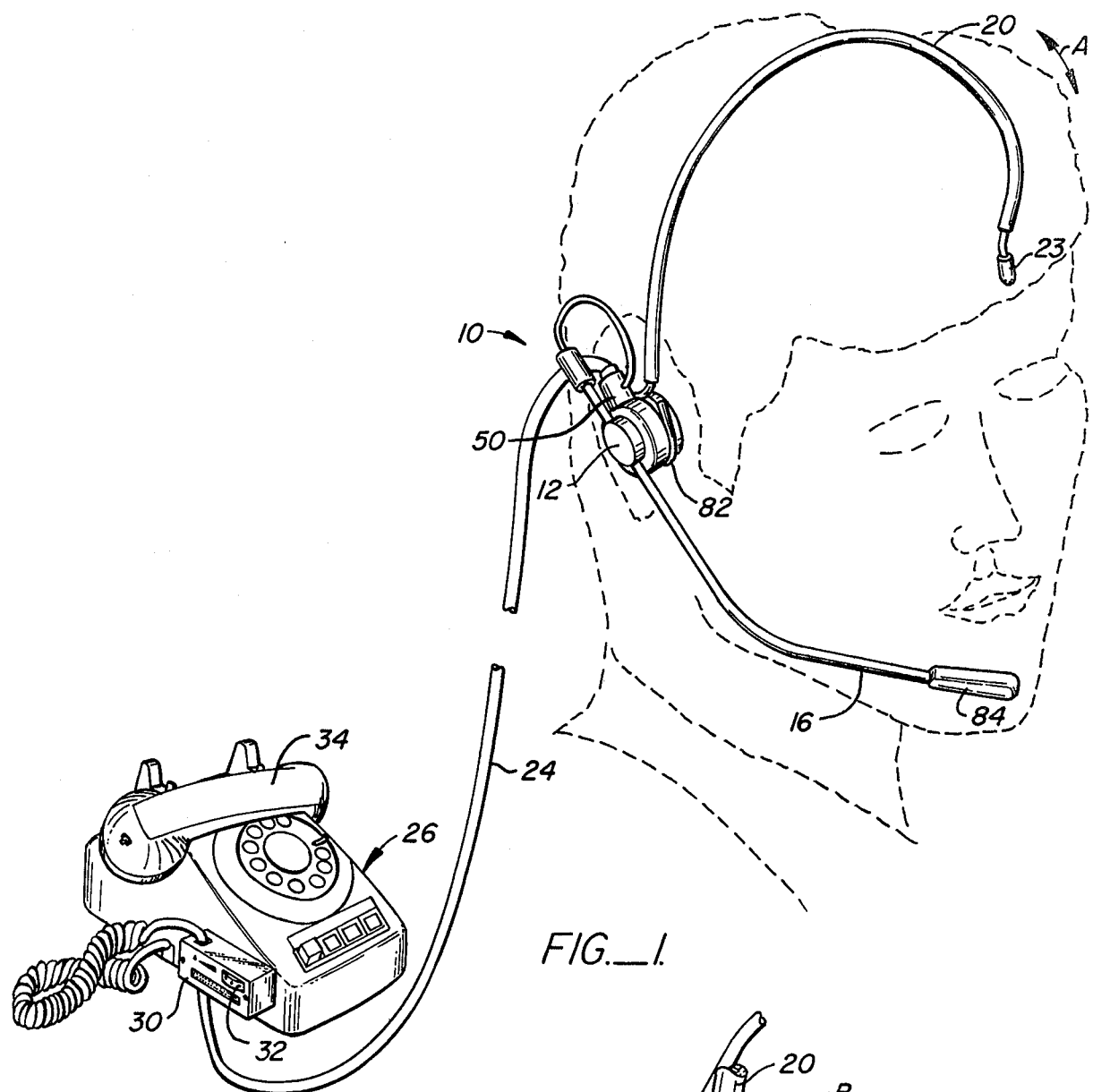
FIG._1.
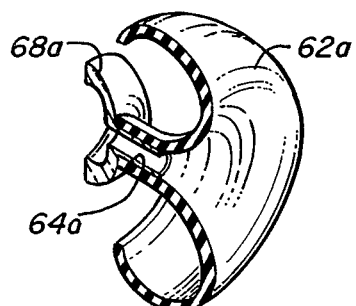
FIG._4.
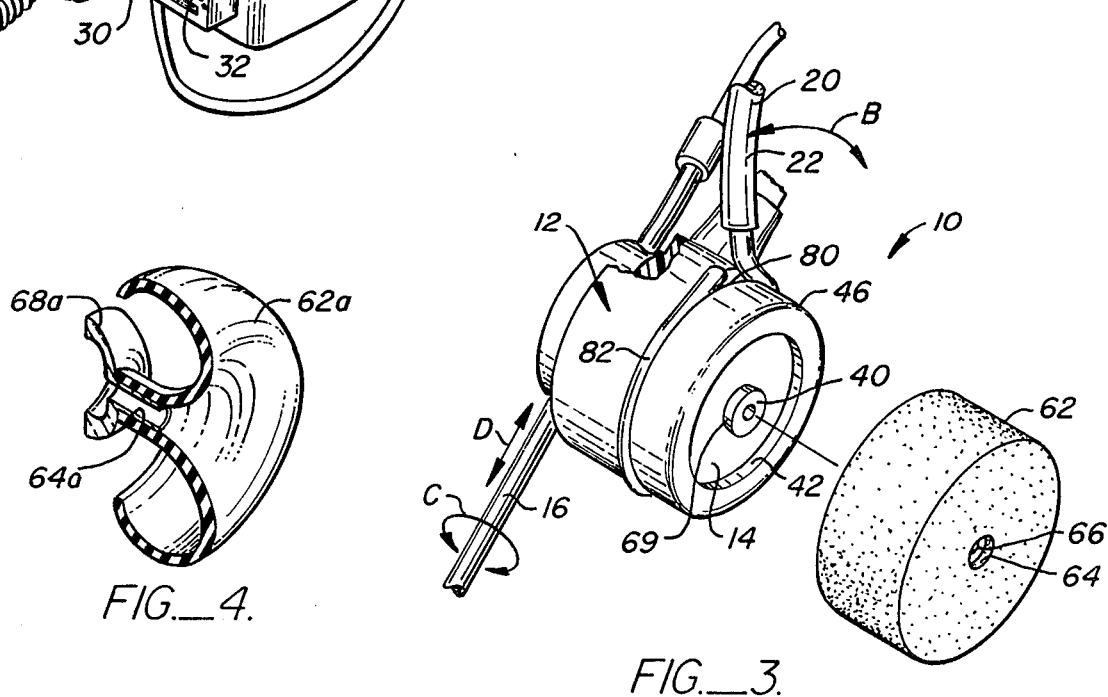
FIG._3.

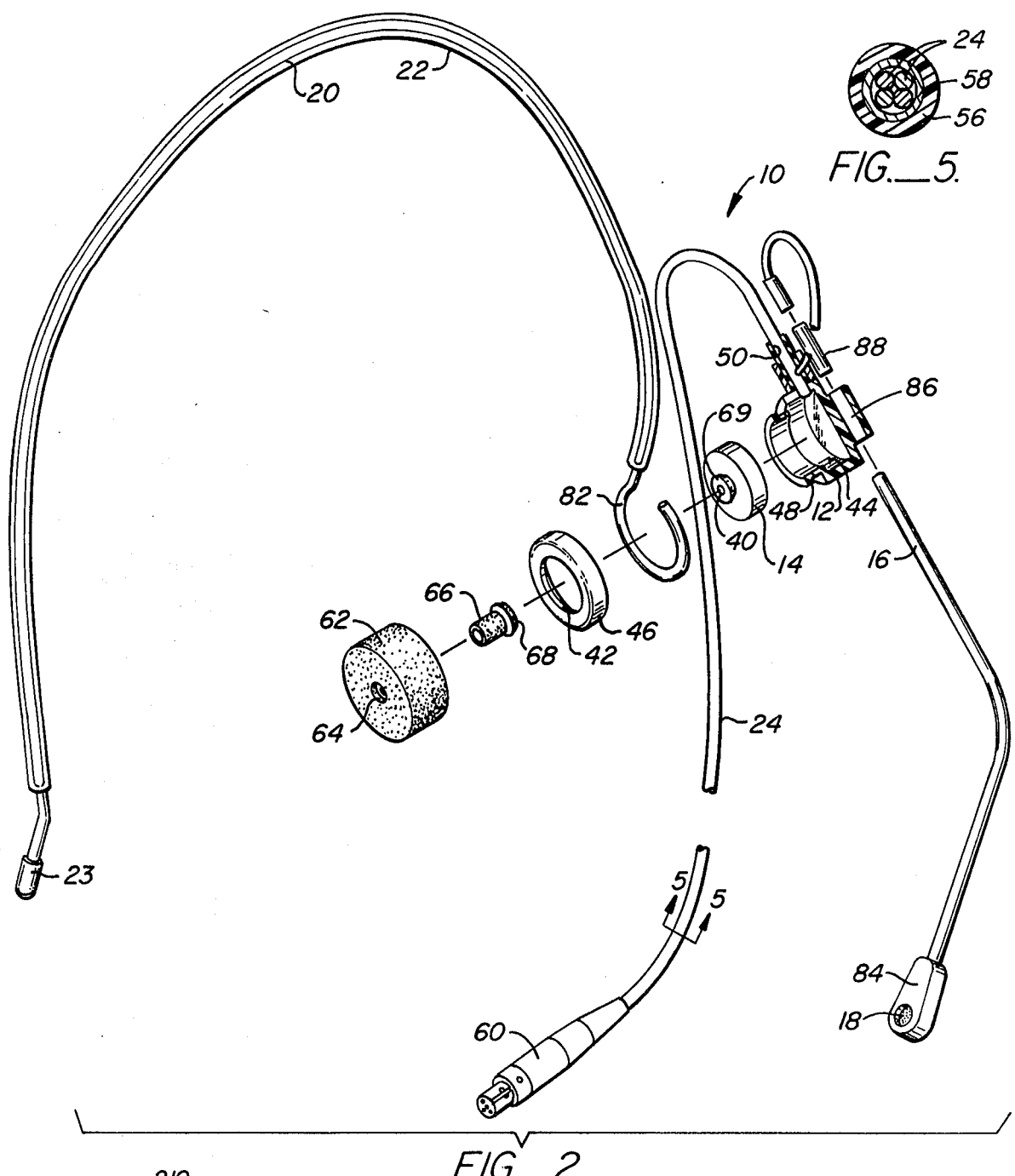
FIG._5.
FIG._2.
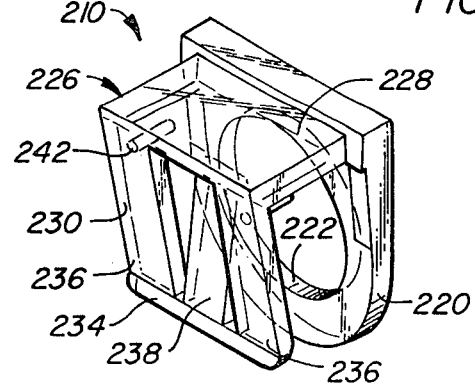
FIG._9.
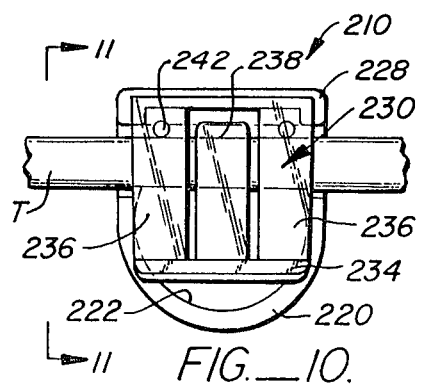
FIG._10.

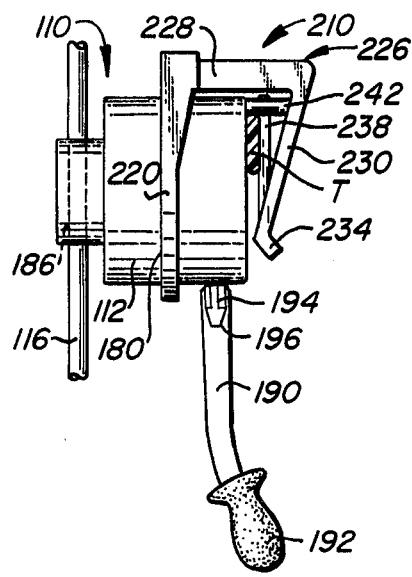
FIG._11.
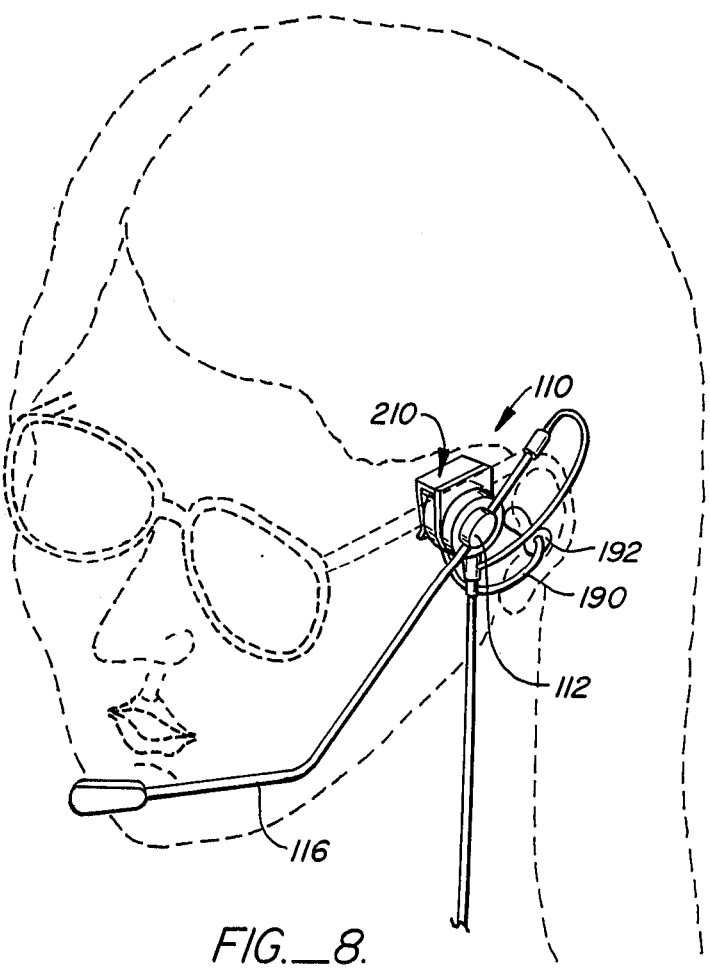
FIG._8.
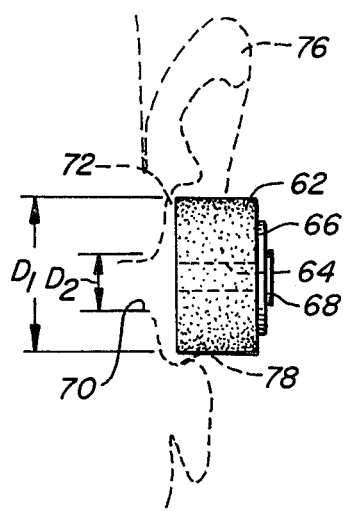
FIG._6.
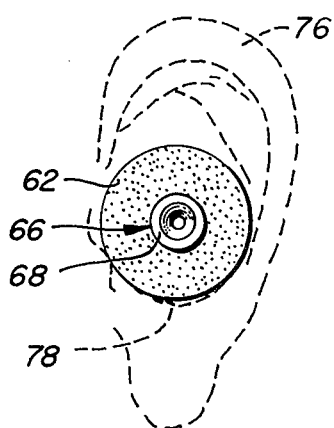
FIG._7.

ADJUSTABLE HEADSET

BACKGROUND OF THE INVENTION

The subject invention relates to an adjustable minature headset particularly adapted for use with a telephone. The headset includes both microphone and receiver elements which are connectable to a dual amplifier circuit for boosting both incoming and outgoing signals. The headset is relatively small and lightweight and may be readily adjusted for maximum comfort of the wearer.

In the prior art, a variety of headsets were developed for use with telephone systems. Presently, the primary users of headsets are attendants, such as switchboard operators and reservation clerks, who spend much of the day speaking on the telephone. By wearing a headset, the attendant is free to use her hands for other tasks including message taking, or typing on a keyboard. In addition, the attendant is not required to press a heavy handset against her ear which can be both uncomfortable and tiring.

Even though the prior art headsets had certain advantages over a standard telephone handset, the market for headsets still remains fairly limited. More specifically, the prior art headsets have various shortcomings which prevent them from being more universally accepted in the business world. As can be appreciated, there are many occupations where a significant portion of the work day is spent on the telephone. It is an object of the subject invention to provide a new and improved miniature headset which overcomes the shortcomings of the prior art and which will be accepted in a wide range of markets.

Examples of prior art headsets can be found in U.S. Pats. No. 3,548,118 issued Dec. 15, 1979, and U.S. Pat. No. 3,610,841 issued Oct. 5, 1971, both to Hutchings. The headset disclosed in these patents includes a housing having receiver and microphone transducers disposed therein. The housing is configured with an arcuately shaped surface so that it may be worn behind the user'ear. A voice tube is provided which is in communication with the microphone transducer and extends to a point adjacent the mouth of the wearer. Similarly, an ear tube is provided in communication with the receiver transducer. An ear plug is connected to the free end of the ear tube for insertion within the auditory canal of the wearer's ear. In use, incoming electrical signals from the telephone are converted into audible sound waves which are channeled through the ear tube directly into the wearer's ear.

These types or prior art headsets were undesirable for a variety of reasons. For example, the headsets are uncomfortable to wear for extended periods of time. As can be appreciated, the full weight of the headset must rest behind the ear of the wearer. Further, the fixed flat configuration of the housing will not be optimal for all users, such that pressure is placed on the mastoid process causing pain and headaches.

Other shortcomings of the prior art headsets relate to the use of the ear plug, which is intended to be inserted within the auditory canal of the wearer's ear. Frequently the continual use of an invasive ear plug gives rise to infections of the ear. Further, infections are easily spread when the headset is used by a number of different people.

Another shortcoming related to the use of an ear plug concerns the problems associated with high voltage surges. More particularly, disturbances, such as electrical storms, frequently cause a high voltage surge to be introduced into the phone line. This surge will result in a relatively high decibel level of sound being generated by the telephone. These surges often are painful to the user and can even cause damage to an eardrum since the entire force of the sound is channeled from the transducer directly to the eardrum via the ear tube and ear plug which seals the ear canal. Accordingly, it would be desirable to provide an improved headset which is capable of channeling sounds to the user's ear without an invasive ear plug thereby reducing the likelihood of infection and preventing damage to the ear due to high voltage surges.

Another example of a prior art headset can be found in U.S. Pat. No. 3,184,556, issued May 18, 1965 to Larkin. The latter patent discloses a headset which includes a spring clip for attaching the housing of the headset to the side temple of an eyeglass-type frame. The spring clip shown in the latter patent can only be used with a particular type of temple having corresponding, complimentary dimensions. Other clips have been developed which include a leaf spring compatible with temples having dimensions that fall within a relatively limited range. Due to the increasing variety of frame designs, it would be desirable to provide a clip which can be utilized with many of the new styles.

SUMMARY OF INVENTION

Accordingly, it is an object of the subject invention to provide a new and improved adjustable headset for use with telephone systems.

It is a further object of the subject invention to provide a new and improved headset which is extremely lightweight and comfortable to wear for extended periods of time.

It is another object of the subject invention to provide an adjustable headset which does not require an ear plug that invades the auditory canal of the user thereby reducing the likelihood of infection and minimizing the undesirable effects of voltage surges.

It is still a further object of the subject invention to provide a new improved headset having a cushion means which functions to space the ear plug from the user's ear.

It is still another object of the subject invention to provide a new and improved headset having a cushion means which functions both as a weight bearing support and a pivot point about which the headset can be adjusted.

It is still a further object of the subject invention to provide an adjustable headset having a new and improved clip means to facilitate attachment of the headset to a wide variety of eyeglass frames.

In accordance with these and many other objects, the subject invention provides for new and improved lightweight adjustable headset particularly adapted for use with telephone systems. The headset includes a generally cylindrical housing having a receiver transducer disposed therein for converting electrical signals into sound waves audible to the user. A microphone boom is connected to the housing and includes an electret condensor microphone located at its free end. The microphone is capable of converting sound waves into electrical signals to be transmitted over the phone lines. Wire means are provided for electrically connecting both the microphone and receiver elements to the telephone.

Preferably, a dual receiver and microphone amplifier is interposed between the headset and the telephone for boosting incoming and outgoing signals.

A support means is provided for maintaining the housing in a selected position relative to the head of the user. In one preferred embodiment of the subject invention, the support means is defined by a U-shaped wire band connected to the housing and having dimensions substantially corresponding to the user's head. In the latter embodiment, a cylindrical cushion means is also provided which is affixed to one end of the housing and is configured to rest against the user's ear. A sound port in the housing enables audible sounds waves to travel from the receiver transducer through the cusion means and into the user's ear. Preferably, some form of ear plug is mounted within the cushion means to aid in transmitting the sounds through the cushion.

In accordance with the subject invention, the cushion means is provided with a diameter greater than the diameter of the auditory canal of the user's ear such that the ear plug within the cushion is spaced away from the user's inner ear. Thus, there is no invasion of the ear canal by a ear plug thereby reducing the likelihood of infection and permitting the dissipation of sound surges. In addition, the diameter of the cushion means is small enough to permit the cushion means to be received within the outer perimeter of the user's earlap. This configuration enables the cushion means to function both as a pivot point, to facilitate adjustment of the headset, and as a load bearing support. By this arrangement, the weight of the headset is distributed between the wire band and the cushion means such that the headset may be comfortably worn for extended periods of time.

In a second embodiment of the subject invention, the support means includes a new and improved clip for attachment to a pair of eyeglasses. The clip is generally L-shaped in configuration having first and second arms. The second arm is provided with a plurality of spring braces which enable the clip to be readily mounted to eyeglass temples of various thicknesses.

In both embodiments of the subject invention, the support means for affixing the housing to the wearer's head includes a circular bracket member which is slidably mounted in a circumferential grove formed on the housing. By this arrangement, the housing can be rotated relative to the support means to facilitate adjustment of the position of the headset.

The microphone boom of the subject heaset is also mounted to facilitate adjustment. More particularly, the housing is provided with an elongated cylindrical channel extending in a radial direction. The boom is formed with a generally circular cross-section such that one end thereof can be slidably mounted within the channel of the housing. Preferably, a plastic liner is interposed between the boom and the channel such that interconnection therebetween is relatively stable while permitting both the rotational and translational movement of the boom relative to the housing.

As discussed more fully hereinbelow, the subject headset is adjustable in a plurality of axes. More particularly, the microphone boom may be adjusted both translationally and rotationally relative to the housing. In addition, the support means is rotationally movable relative to the housing. Finally, in the first embodiment of the subject invention, the cushion means functions as a pivot point to provide a fourth axis adjustment.

Further objects and advantages of the subject invention will become apparent from the following detailed description when taken in conjunction with the drawings in which:

BRIEF DESCRIPTION OF THE DRAWINGS

FIG. 1 is a perspective view of the first embodiment of the new and improved adjustable headset of the subject invention shown connected to a telephone.

FIG. 2 is an exploded perspective view, partially in section, of the first embodiment of the new and improved adjustable headset of the subject invention.

FIG. 3 is an exploded, fragmentary prespective view, partially in section, of the housing of the subject invention.

FIG. 4 is a fragmentary perspective view of an alternate form of cushion means.

FIG. 5 is a cross sectional view of the wires, interconnecting the headset with the telephone, taken along the line 5—5 in FIG. 2.

FIG. 6 is a side elevational view illustrating the positioning of the cushion in the ear of a user.

FIG. 7 is an elevational view taken from the right side of FIG. 6 illustrating the positioning of the cushion means within the user's ear.

FIG. 8 is a perspective view of a second embodiment of the adjustable headset of the subject invention including the new and improved clip for affixing the headset to the eyeglasses of a wearer.

FIG. 9 is a perspective view of the new and improved clip used in the second embodiment of the subjection invention.

FIG. 10 is a side elevational view of the clip illustrated FIG. 9.

FIG. 11 is an end elevational view of the clip of the subject invention.

DETAILED DESCRIPTION OF THE PREFERRED EMBODIMENTS

Referring generally to FIGS. 1-3, there is illustrated the first embodiment of the adjustable headset 10 of the subject invention. The headset 10 includes a housing 12 containing a receiver transducer 14. A boom 16 having a microphone 18 is mounted to the housing. A wire headband 20 is also mounted to the housing for affixing the headset to the wearer. Wire band 20 which is preferably formed from metal is generally U-shaped in configuration having dimensions corresponding to the user's head. A plastic sheath 22 may be placed around wire band 20 for sanitary reasons. A plastic tip 23 is provided to facilitate adjustment of the wire band 20.

A set of wires 24, providing discrete connections to both the microphone 18 and the receiver 14, extend from the housing 12 to phone 26. Preferably, an intermediate amplification module 30 is electrically interconnected between the phone 26 and the headset 10. The amplification module 30 includes a dual amplification circuit powered by the D.C. current on the phone line. The circuit raises the voltage of the signals generated by the microphone to useable levels. In addition, an adjustable receiver amplifier circuit, having a potentiometer control 32, is provided for boosting the incoming signals thereby permitting clearer reception of the party on the other end of the call. Since the subject headset 10 is intended to replace the conventional handset 34, the latter may be disconnected from the phone circuit as illustrated in FIG. 1.

The housing 12, which may be formed from a high impact styrene plastic, is generally cylindrical in configuration, having dimensions sufficient to contain a disc-shaped receiver transducer 14. The receiver transducer 14 is similar to those used in hearing aid applications. The receiver 14 is capable of converting electrical signals, carried by wire set 24 into sound waves. The sound waves are projected through opening 40 of the transducer 14.

In order to permit the sound waves to travel directly to the wearer's ear, one end of the housing 12 is provided with an open sound port 42, as illustrated in FIG. 3. Housing 12 may be advantageously manufactured in two sections, as illustrated in FIG. 2. The main body of the housing 12 defines a cavity 44 for mounting the receiver 14. Once the receiver is mounted within the cavity 44 and electrically connected to wires 24, an outer ring 46 may be snapfit over flange 48 to secure the receiver within the housing. Preferably an adhesive is utilized to enhance the interconnection between ring 46 and the main body of the housing.

A hollow stem 50 is formed integrally with housing 12, through which wire set 24 may be mounted. Wire set 24 includes two pairs of wires with one pair being connected to the receiver 14 while the other pair extends down boom 16 and is connected to microphone 18. Wire set 24 is wrapped in a plastic sheath 56 as illustrated in FIG. 5. Preferably, a metal sheath 58 is disposed within the plastic sheath, surrounding the wire set. Metal sheath 58, which may be formed from tinned copper, is flexible and provides shielding from radio frequency interference. Another advantage of flexible metal sheath 58 is that is strengthens the wire set 24 for long lasting durability. As illustrated in FIG. 2, a quick mount connector 60 can be provided intermediate the length of wire set 24 to permit the headset to be rapidly connected to the phone.

In accordance with the first embodiment of the subject invention, a cushion means 62 is provided. Cushion means 62 is preferably cylindrical in configuration and is replaceably connected to the housing 12 covering sound port 42. Cushion means 62 may be formed from a ployurethane compressible foam having a central channel 64 defined therein. Preferably, a hollow plug 66 is fitted within central channel 64. Plug 66 functions to rigidify channel 64 to insure the transmission of sound therethrough.

Plug 66 is also utilized to replacebaly connect cushion means 62 to housing 12. Accordingly, the rear end of plug 66 includes a snap ring 68 which is connectable to a flange 69 formed on the received 14. Thus, cushion means 62 may be readily removed and replaced. By this arrangement, when the headset is used by more than one person, the cushion means can easily be replaced thereby substantially minimizing the spread of infection.

As illustrated in FIG. 6 and 7, cushion means 62 is intended to rest against the user's ear and is configured to overcome the shortcomings in the prior art headsets. More particularly, the diameter $D_1$ of cushion means 62 is configured to be greater than the diameter $D_2$ of the auditory canal 70 of a user's ear. Thus, plug 66 must necessarily be spaced away from the inner ear such that infections caused by an invasive earplug are substantially diminished. Further, the discomfort associated with the wearing of an invasive earplug for an extended period of time is eliminated.

Another advantage obtained by the unique configuration of the subject cushion means 62 relates to the dissipation of unexpected high voltage surges. More particularly, and as is mentioned above, high voltage surges caused by outside sources are converted into loud level noise by the transducer. In the prior art, this noise was channeled directly into the inner recess of the ear via the eartube and earplug. In contrast, due to the configuration of cushion means 62, plug 66 is spaced from the auditory canal permitting high levels of excess sound to bleed away from the ear canal 70 thereby reducing the likelihood of ear damage. As can be appreciated, the irregular shape of the human ear creates plurality of channels or gaps between cushion means 62 and the ear (indicated at 72 in FIG. 6) which provide pathways for excess sound surges to escape. In addition, cushion means 62 may be constructed such that sound will pass through the cells of the foam. Accordingly, while low volume sounds will be channeled directly towards the ear, surges will tend to bleed out in all directions through the foam thereby reducing the concussive impact on the eardrum.

In accordance with the subject invention, the diameter $D_1$ is intended to be small enough to enable cushion means 62 to be received within the outer perimeter of the user's earlap 76 . By defining the dimensions of cushion means 62 within these limits additional advantages over the prior art are obtained. More particularly, cushion means 62 will be received in part within the cartilage structure of the ear, as shown at 78 in FIG. 6. Accordingly, cushion means 62 functions as a load bearing support such that the weight of the headset is distributed between the headband 20 and cushion means 62. By distributing the weight, the headset may be comfortably worn for extended periods of time.

Another significant advantage of cushion means 62 relates to the adjustability of the headset. More particularly, cushion means 62 is capable of functioning as a pivot point about which the entire headset can be adjusted for maximum signal transfer and wearer comfort. This capability may be achieved for two reasons. First, the diameter $D_1$ of cushion means 62 is less than the size of the earlap 76. By this arrangement, and as illustrated in FIG. 6, a ball joint type relationship is created with the ear. Secondly, cushion means 62 is compressible enabling it to pivot while remaining in contact with the ear cartilage. Accordingly, support is maintaining while movement is allowed. In use, the headset can be adjusted by rotating wire bank 20 in the direction indicated by arrows A in FIG. 1, about the pivot point defined by cushion means 62.

Referring the FIG. 4, there is illustrated an alternate embodiment of cushion means 62a of the subject invention. Cushion 62a is formed of a soft, pliable plastic material and includes a central cavity 64a, for channeling sound waves from the receiver to the wearer. In this embodiment, snap ring 68a is formed integrally with the cushion means and a plug 66 is not necessary. Similar to the foam cushion means 62, cushion 62a is intended to rest on the cartilage of the ear, thereby reducing the likelihood of infection and permitting the dissipation of sound surges. Further, the pliant characteristics of the plastic enable the headset to be pivoted about the cushion means 62a during adjustment. It is to be understood of course that any suitable material having pliant characteristics, including liquid filled pads could be utilized to form the cushion means 62 of the subject invention. Preferably, some form of snap ring 68 is provided to facilitate the connection of the cushion means to the headset. As mentioned above, use of the snap ring 68 enables a plurality of user's to share a single headset by permitting the replacement of the cushion means 62 thereby inhibiting the spread the infection.

In addition to the adjustability provided by cushion means 62, the subject headset has been provided with additional means for adjustment for maximizing signal transfer and wearer comfort. For example, wire band 20 is rotatably mounted to housing 12. More particularly, housing 12 is provided with circumferential groove 80 disposed intermediate the side edges of the housing. One end of wire band 20 is defined by a generally circular bracket member or loop 82 which is slidably engaged within groove 80. During the assembly of the housing 12, bracket 82 of headband 20 may be mounted over flange 48, prior to the mounting of ring 46. When the sections of the housing are assembled, pressure is exerted on the bracket portion 82 to substantially stabilize the position of band 20 relative to the housing. However, the metal to plastic interface permits the rotation of the metal wire band 20 relative to the housing when desired, in the direction indicated by arrows B in FIG. 3. In combination with the pivoting action permitted by cushion means 62, the subject headset can thus be adjusted in two axes.

Another means of adjustment is provided by the slideable mounting of boom 16. Microphone boom 16 is preferably L-shaped in configuration having a circular cross-section, and is formed from nickel plated brass. One end of boom 16 includes a housing 84 for containing microphone 18. Preferably microphone 18 is an electret condensor type capable of converting sound into electrical signals.

In accordance with the subject invention, housing 12 includes an open-ended cylindrical channel 86 for mounting the boom. Channel 86 extends radially with respect to cylindrical housing 12. One end of boom 16 is mounted within channel 86 in a manner such that the position of the boom, relative to the housing, is substantially stabilized, while permitting the rotational and translational movement of the boom when desired. In order to achieve this relationship, a soft plastic liner 88, having a cylindrical configuration, is interposed between the boom 16 and the channel 86. In the prefered embodiment of the subject invention, the cross-sectional diameter of the boom is on the order of 0.127 of an inch while the cross-sectional diameter of channel 86 is 0.187 of inch. Cylindrical liner 88 is provided with an outer diameter of 0.187 of an inch and an inner diameter of 0.125 of an inch. The interengagement between the boom 16 and the liner is sufficient to stabilize their relative positions. However, due to the plastic to metal interface between liner 88 and the boom, it is possible to move the boom 16 relative to the channel 86. More specifically, and as illustrated in FIG. 3, by placing a torque on the boom, it can be rotated in the direction of arrows C. Further, by pulling or pushing the boom, translational movement can be achieved in the direction of arrows D. The adjustability of the boom enables the wearer to position the microphone in the desired location.

Another advantage of the plastic liner is that it can compensate for manufacturing irregularities. As can be appreciated, in practice, the desired diameters of the boom 16 and channel 86 may be difficult to achieve. Thus, by utilizing the compressible liner 88, the desired frictional engagement can be achieved even when the boom and channel are not manufactured to exact tolerances.

A headset formed in accordance with the above description is provided with adjustability in four axes. More specifically, the microphone boom may be adjusted both translationally and rotationally within channel 86. Further, headband 20 may be rotationally moved with respect to the housing 12. Finally, due to the unique construction of cushion means 62, the entire placement of the headset can be altered utilizing cushion means 62 as a pivot point. In practice, when only a single user will wear the headset, the position of the boom and the rotational position of the housing are adjusted only during the initial fitting. The stable mounting of these components will prevent their unwanted shifting. The exact position of the headset combination can then be adjusted for each subsequent use by pivoting the headset about cushion means 62.

Referring now the FIGS. 8-11 there is illustrated the second embodiment of the adjustable headset 110 of the subject invention. The second embodiment is intended to be affixed to the eyeglasses of the wearer. The headset 110 includes a housing 112 having substantially the same configuration as in the first embodiment. More particularly, a cylindrical housing 112 is provided having a circumferential groove 180 extending therearound and disposed intermediate the ends thereof. A radially extending channel 186 is provided for mounting the boom 116. The boom is mounted in a mannner identical to the first embodiment and need not be further described.

Since the headset is to be mounted on a temple of a pair of eyeglasses, direct transfer of the sound to the ear cannot be achieved. Accordingly, a plastic ear tube 190 is provided which is connectable to the housing for transmitting sound to the ear of the wearer. Tube 190 includes an ear plug 192 for insertion within the ear canal. Tube 190 is formed from a flexible plastic to facilitate its positioning adjacent the ear. The rigid tube segment 194 is connected to the housing and extends outwardly therefrom. The interior end of tube segment 194 is in communication with the receiver transducer (not shown). The opposed, exterior end of tube segment 194 includes a circumferential lip 196. During assembly, ear tube 190 is press fit over the circumferential lip 196 of tube segment 194 to hold it securely in place. It is envisioned that over the lifetime of the headset, tube 190 will be replaced at regular intervals. Preferably, ear tube 19 will be replaced when the headset is transferred from one user to another.

The second embodiment of the headset 110 is intended to be connected to the eyeglasses of the wearer via a new and improved clip 210. As discussed above, in the prior art, clips have been used to affix a headset to the temple of an eyeglass frame. The clip illustrated in U.S. Pat. No. 3,184,556 is connectible to a frame having a fixed size. Various other clips have been developed in the prior art intended to achieve a similar connection.

The most common clip found in the prior art included a single spring member for clamping the temple of an eyeglass frame. The clip would generally be formed from a plastic material and be configured to accommodate a limited range of standard size frames. The latter clips, however, were ineffective for gripping temples having relatively small cross sectional dimensions. As can be appreciated, there is a wide variety of eyeglass frames being marketed today, including metal frames, having relatively thin cross-sectional dimensions. Accordingly, it is an object of the subject invention to provide a clip which will accommodate not only the standard size eyeglass frame but will also be effective to securely grip a relatively thinner temple. The new and improved clip 210 includes a bracket member 220 having a circular aperture 222 formed therein. The bracket member is intended to be engaged within groove 180 of the housing 112 of the headset. As in the first embodiment, the housing is formed from two sections (not shown) such that during assembly of the headset, the bracket 220 may be interposed and locked between the two sections of the housing.

Clip 210 further includes an L-shaped support member 226 formed from a resilient plastic material. Support member 226 is defined by first and second connected arms 228 and 230 respectively. The first arm 228 is connected to bracket member 220 and projects perpendicularly outwardly therefrom, an amount sufficient to extend beyond the end of the housing 112, as seen in FIG. 11. Second arm 230 is connected to first arm 228 and forms an acute angle therewith, such that the free end thereof is biased inwardly towards the housing. Preferably, an outwardly flaired rail 234 is provided for guiding the temple T into engagement with the clip.

In accordance with the subject invention, second arm 230 includes a pair of outer braces 236 and a central inner brace 238. Central brace 238 is connected to the lower end of arm 230 and forms an acute angle therewith, such that the opposed free end of the central brace projects inwardly towards the housing. Second arm 230 may also be provided with a pair of inwardly projecting stop pins 242, for stabilizing the mounting. Stop pins 242 are formed integrally with the outer braces 236 and project inwardly towards the housing.

As pointed out above, the subject clip 210 will provide effective gripping action with a wide variety of temple sizes. Referring to FIG. 11, the use of the subject clip with a relatively thin temple T is illustrated. When mounting the subject headset, the housing is positioned such that the temple T is located between the outwardly flaired bottom rail 234 of second arm 230 and the opposed side edge of the housing. By moving the housing downwardly, the temple T will bias the second arm 230 outwardly permitting the temple to be interposed between the second arm 230 and the housing. The temple may then be moved upwardly until its upper edge comes into contact with stop pins 242. As illustrated in FIG. 11, since temple T is relatively narrow, the outer braces 236 alone could not provide an effective gripping action. Thus, it is apparent that a prior art type clip, having just a single brace, would not be capable of gripping a thin temple. In contrast, the subject invention includes central brace 238 which is connected and biased inwardly from the bottom of the clip. By this arrangement, central brace 238 is inwardly directed an amount sufficient to bias temple T into contact with the housing.

The subject clip is also capable of gripping a larger sized temple. In the latter situation, when a larger sized temple is inserted between the second arm 230 and the housing 112, the temple will tend to bias central brace 238 back into coplaner relationship with the outer braces 236, such that the entire second arm functions to press the temple against the side of the housing 112. Thus, the new and improved clip mount 110 of the subject invention is capable of accommodating eyeglass temples of various sizes.

The second embodiment of the subject headset is also fully adjustable. As discussed above, the slidable mounting of boom 116 allows it to be rotationally and translationally adjusted. In addition, bracket member 220 is mounted in circumferential groove 180 in a manner similar to the first embodiment. Accordingly, the position of the housing 112 is adjusted by rotating the housing relative to the affixed clip. Rotation of the housing functions to vary the angle of channel 186 relative to the clip, thereby adjusting the position of the boom. In use, once clip 210 is mounted on temple T, the deflection of second arm 230 functions to place a degree of tension on bracket member 220 further stabilizing the mounting.

In summary there is provided a new and improved lightweight adjustable headset particularly adapted for use with the telephone. The headset includes a generally cylindrical housing 12 containing a receiver 14 for converting electrical signals into audible soundwaves. An elongated cylindrical channel 86, extending in a radial direction relative to the housing, is provided for mounting a microphone boom 16. A microphone element 18 is mounted on the end of the boom for converting a user's voice into electrical signals. The boom is mounted to the housing in such a manner that the position of the boom, relative to the housing is stabilized, while permitting its rotational and translational movement when desired.

A support means is provided for maintaining the housing in a selected position relative to the head of the wearer. Each support means includes a circular bracket member which is slideably engaged within a circumferential groove provided in the exterior of the housing. The latter mounting enables the housing to be rotated relative to the support means.

In one embodiment of the subject invention, the support means further includes a U-shaped wire band 20 for placement over the wearer's head. In the latter embodiment of the subject invention, a cushion means 62 is connected to the housing in a manner to permit the passage of sound waves from the receiver directly to the wearer without invading the ear canal. Cushion means 62 is configured with a diameter $D_1$ greater than the diameter of the auditory canal of the user's ear such that the inner plug 66 is spaced away from the auditory canal thereby reducing the likelihood of infection and permitting the dissipation of sound surges. Further cushion means 62 is configured to be small enough to be received within the outer perimeter of the user's earlap. By this arrangement, the cushion means functions as a load bearing support for distributing the weight of the headset more effectively thereby increasing wearer comfort. In addition, the small size and compressibility of cushion means 62 enables the cushion to act as a pivot point about which the headset may be adjusted relative to the user's head. The adjustability of the headset about cushion means, in combination with the rotational capabilities of the housing and rotational and translational movement of the boom, provide adjustability in four axes to maximize sound transfer and wearer comfort.

In an alternate embodiment of the subject invention, the support means consists of a new and improved clip 210 which permits the headset to be affixed to the temple of a pair of eyeglasses. The clip includes an L-shaped support member 226 connected to a bracket member 220. The L-shaped support includes first and second arms 228, 30 and 230 with the second arm being biased inwardly towards the housing. The second arm includes two outer braces 236 and a central intermediate brace 238. The central intermediate brace 238 is connected to the bottom of the second arm and is biased inwardly towards the housing. In use, relatively thinner temples are gripped between the central brace and the housing, while thicker temples are gripped between the entire second arm and the housing.

It is understood that while the subject invention has been disclosed with reference to preferred embodiments, various changes and modifications could be made therein by one skilled in the art without varying from the scope and spirit of the subject invention as defined by the appended claims.

I claim:

1. A lightweight, adjustable headset for use with a communication device comprising:
   a generally cylindrical housing with one end thereof including a sound port;
   a receiver element disposed within the housing for converting electrical signals into sound waves audible to the user;
   a microphone boom, with the boom being generally L-shaped, with one end of the boom being fixed to the end of the housing opposed to the sound port;
   a microphone element, connected to the free end of the boom for converting sound waves into electrical signals;
   wire means providing discrete connections between the communications device and the microphone and receiver elements respectively;
   support means for holding said housing in a selected position relative to the head of the user, with the support means being defined by a U-shaped wire band connected to the housing and having dimensions substantially corresponding to the user's head; and
   cylindrical cushion means, with one end thereof being affixed to the end of the housing having the sound port and configured to rest against the user's ear, said cushion means including a channel aligned with said sound port, said cushion means further including an elongated hollow plug mounted in said channel to permit sound to pass from the housing to the user's ear, with the cushion means having a diameter greater than the diameter of the auditory canal of the user's ear such that the sound port of the housing is spaced away from the auditory canal of the ear thereby reducing the likelihood of infection and permitting dissipation of sound surges, and wherein the diameter of the cushion means is small enough to enable the cushion means to be received within the outer perimeter of the user's earlap whereby the cushion means functions as a load bearing support and as a pivot point to permit the adjustment of the position of the headset relative to the user's head.

2. An adjustable headset as recited in claim 1 wherein said cushion means is formed from a compressible material.

3. An adjustable headset as recited in claim 1 wherein the cushion means is replaceably mounted to said housing such that when the headset is transferred to another user, the cushion means may be readily replaced thereby reducing the likelihood of infection.

4. An adjustable headset as recited in claim 3 wherein said cushion means includes a snap ring connectible to a flange projecting from said housing to define said replaceable mounting.

5. An adjustable headset as recited in claim 1 wherein said housing includes a circumferential groove disposed intermediate its distal ends on the exterior surface thereof, and wherein said wire band includes a circular bracket member slidably engaged within the groove of the housing, with the slidable mounting pemitting the rotational movement of the wire band relative to the housing such that the position of the headset can be adjusted thereby maximizing sound transfer and wearer comfort.

6. A lightweight adjustable headset as recited in claim 1 wherein the microphone boom is generally cylindrical in cross-section and is slidably mounted within a channel formed in said housing, said channel being cylindrical in cross-section and extending in a radial direction, with the slidable mounting of said boom permitting both a rotational and translational movement of the boom relative to the housing.

7. An adjustable headset as recited in claim 6 further including a generally cylindrical, soft plastic liner disposed within the channel surrounding the boom.

8. An adjustable headset as recited in claim 1 wherein the wire means includes a plurality of individual wires, with all the wires being encased in a plastic sheath extending from the housing to the communication device, with the wire means further including an intermediate flexible metal sheath disposed within the plastic sheath and surrounding all the wires thereby shielding the wires from radio frequency interference while simultaneously strengthening and protecting the wires.

9. An adjustable headset as recieted in claim 8 wherein the flexible metal sheath is formed from tinned copper.

10. An adjustable headset as recited in claim 2 wherein said sound boom is generally L-shaped having a circular cross section, with one end of the boom being slidably mounted within a channel formed in said housing in a manner to permit both the rotational and translational movement of the boom relative to the housing.

11. An adjustable headset as recited in claim 1 wherein said cushion means is replaceably mounted to said housing, with said cushion means including a snap ring connectable to a flange projecting from said housing to define said replaceable mounting.

12. An improved clip for use with a headset to enable the headset to be connected to eyeglass temples of various thicknesses, said clip comprising:
   bracket means for connecting said clip to said headset; and
   an L-shaped spring member having first and second connected arms, the first arm being connected to said bracket means and extending outwardly therefrom away from the headset, with the second arm being disposed at an acute angle relative to the first arm such that the free end thereof is biased inwardly towards the headset, and with the second arm including two outer braces and a central intermediate brace, the central intermediate brace being connected only to the free end of the second arm and disposed at an acute angle relative to the plane of the second arm such that the free end of the central brace is biased inwardly towards the headset whereby when the headset is mounted to the eyeglasses of the user, the temple is inserted between the second arm and the headset, such that a relatively thin temple is securely gripped between the central brace and the housing, while a relatively thicker temple will tend to deflect the central brace into coplanar relationship with the outer braces and be gripped between the entire second arm and the headset.

13. An adjustable headset as recited in claim 12 wherein the second arm further includes a pair of stop pins formed on the outer braces adjacent to the first arm and extending towards the headset, the stop pins acting to locate and stabilize the position of the temple relative to the clip.

14. An adjustable headset as recited in claim 12 wherein the free end of the second arm is defined by a rail member that is flared outwardly away from the headset to facilitate the mounting of clip on an eyeglass temple.

15. A lightweight adjustable headset for use with a communication device comprising:
 a housing including a sound port;
 a receiver element disposed within the housing for converting electrical signals into sound waves audible to the user;
 a microphone element for converting sound waves into electrical signals;
 an elongated sound boom connected to said housing and extending towards the mouth of the user;
 wire means providing discrete connections between the communications device and the microphone and receiver elements, respectively;
 support means for holding said housing in a selected position relative to the head of the user, with the support means being defined by a U-shaped wire band connected to the housing and having dimensions substantially corresponding to the user's head; and
 cushion means affixed to the end of the housing having the sound port and configured to rest against the user's ear, said cushion means including a channel aligned with said sound port, said cushion means further including an elongated hollow plug mounted in said channel for transmitting sound directly to the user's ear.

16. An adjustable headset as recited in claim 15 wherein the exterior surface of said housing includes a circumferential groove, and wherein said wire band includes a circular bracket member slidably engaged with the groove of the housing.

17. An adjustable headset as recited in claim 15 wherein said cushion means is larger than the diameter of the auditory canal of the user's ear and small enough to be received within the outer perimeter of the user's earlap.

18. An adjustable headset as recited in claim 15 wherein said microphone element is affixed to the free end of said sound boom.

* * * * *

REEXAMINATION CERTIFICATE (842nd)
United States Patent
Larkin

[11] B1 4,420,657
[45] Certificate Issued Apr. 26, 1988

[54] ADJUSTABLE HEADSET

[75] Inventor: Wallace K. Larkin, Scotts Valley, Calif.

[73] Assignee: ACS Communications, Inc., Scotts Valley, Calif.

Reexamination Request:
 No. 90/001,263, Jun. 15, 1987

Reexamination Certificate for:
 Patent No.: 4,420,657
 Issued: Dec. 13, 1983
 Appl. No.: 316,230
 Filed: Oct. 29, 1981

[51] Int. Cl.⁴ ............ H04R 23/00; H04M 1/03; H04M 1/04
[52] U.S. Cl. ............ 379/430; 181/129; 181/132; 381/187; 381/188; 381/205; 381/189; 24/3 C
[58] Field of Search ........ 248/231.8, 316.7, DIG. 2, 248/228; 381/187, 25, 188, 205; 24/3 C, 507, 541, 543; 379/430

[56] References Cited

U.S. PATENT DOCUMENTS

| | | | |
|---|---|---|---|
| 2,025,398 | 12/1935 | Pocock | 379/430 |
| 2,647,956 | 8/1953 | Newman et al. | 381/169 |
| 2,954,442 | 9/1960 | Mickenberg | 381/205 |
| 3,030,458 | 4/1962 | Gongoll | 379/430 |
| 3,184,556 | 5/1965 | Larkin | 379/430 |
| 3,216,685 | 11/1965 | Raymond | 248/316.7 |
| 3,311,713 | 3/1967 | Knuebel | 381/183 |
| 3,548,118 | 12/1970 | Hutchings | 379/430 |
| 3,588,384 | 6/1971 | Negley | 381/205 |
| 3,610,841 | 10/1971 | Hutchings | 379/430 |
| 3,645,354 | 2/1972 | Kliewer | 381/187 |
| 3,798,712 | 3/1974 | Bonis | 24/3 C |
| 3,971,900 | 7/1976 | Foley | 379/430 |
| 4,039,765 | 8/1977 | Tichy et al. | 379/430 |
| 4,090,042 | 5/1978 | Larkin | 379/430 |
| 4,302,635 | 11/1981 | Jacobsen et al. | 381/187 |

FOREIGN PATENT DOCUMENTS

| | | |
|---|---|---|
| 37-10516 | 5/1962 | Japan |
| 45-24311 | 9/1970 | Japan |
| 49-10820 | 3/1974 | Japan |
| 306800 | 7/1955 | Switzerland |

Primary Examiner—Forester W. Isen

[57] ABSTRACT

A lightweight adjustable headset is disclosed for use with telephones. The headset includes a housing having a microphone boom mounted in a manner to permit rotational and translational movement. A support member is provided for affixing the headset to the wearer. In one embodiment of the subject invention, which includes a wire headband for support, a cushion is affixed to the housing and is adapted to rest against the ear of the wearer. The cushion is configured such that it functions as a load bearing support and as a pivot point to permit the adjustment of the position of the headset relative to the user's head. In addition, the cushion functions to reduce the likelihood of infections and for dissipating sound surges. In an alternate embodiment of the subject invention, the support member includes a clip to permit the mounting of the headset to the frame of the pair of eyeglasses. The subject clip is capable of gripping temples of various thicknesses.

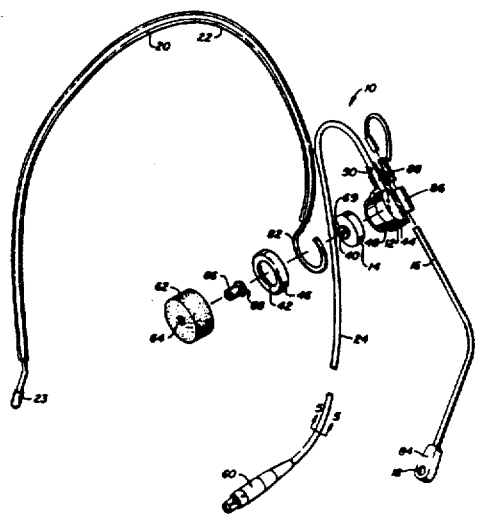

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 13 is cancelled.

Claims 1, 12, 14 and 15 are determined to be patentable as amended.

Claims 2-11 and 16-18, dependent on an amended claim, are determined to be patentable.

1. A lightweight, adjustable headset for use with a communication device comprising:
   a generally cylindrical housing with one end thereof including a sound port;
   a receiver element disposed within the housing for converting electrical signals into sound waves audible to the user;
   a microphone boom, with the boom being generally L-shaped, with one end of the boom being fixed to the end of the housing opposed to the sound port;
   a microphone element, connected to the free end of the boom for converting sound waves into electrical signals;
   wire means providing discrete connections between the communications device and the microphone and receiver elements respectively;
   support means for holding said housing in a selected position relative to the head of the user, with the support means being defined by a U-shaped wire band connected to the housing and having dimensions substantially corresponding to the user's head; and
   cylindrical cushion means, with one end thereof being affixed to the end of the housing having the sound port and configured to rest against the user's ear, said cushion means including a channel aligned with said sound port, said cushion means further including an elongated hollow plug mounted in said channel to permit sound to pass from the housing to the user's ear, with the cushion means having a diameter greater than the diameter of the auditory canal of the user's ear such that the sound port of the housing is spaced away from the auditory canal of the ear thereby reducing the likelihood of infection and permitting dissipation of sound surges, and wherein the diameter of the cushion means is small enough to enable the cushion means to be received within the outer perimeter of the user's earlap whereby the cushion means functions as a load bearing support and as a pivot point to permit the adjustment of the position of the headset relative to the user's head *and, wherein said cushion means is configured to prevent said hollow plug from penetrating the auditory canal of the user.*

12. An improved clip for use with a headset to enable the headset to be connected to eyeglass temples of various thicknesses, said clip comprising:
   bracket means for connecting said clip to said headset; and
   an L-shaped spring member having first and second connected arms, the first arm being connected to said bracket means and extending outwardly therefrom away from the headset, with the second arm being disposed at an acute angle relative to the first arm such that the free end thereof is biased inwardly towards the headset, and with the second arm including two outer braces and a central intermediate brace, the central intermediate brace being connected only to the free end of the second arm and disposed at an acute angle relative to the plane of the second arm such that the free end of the central brace is biased inwardly toward the headset whereby when the headset is mounted to the eyeglasses of the user, the temple is inserted between the second arm and the headset, such that a relatively thin temple is securely gripped between the central brace and the housing, while a relatively thicker temple will tend to deflect the central brace into coplanar relationship with the outer braces and be gripped between the entire second arm and the headset, *and wherein the second arm further includes a pair of stop pins formed on the outer braces adjacent to the first arm and extending towards the headset, the stop pins acting to locate and stabilize the position of the temple relative to the clip.*

14. An [adjustable headset] *improved clip* as recited in claim 12 wherein the free end of the second arm is defined by a rail member that is flared outwardly away from the headset to facilitate the mounting of clip on an eyeglass temple.

15. A lightweight, adjustable headset for use with a communication device comprising:
   a housing including a sound port;
   a receiver element disposed within the housing for converting electrical signals into sound waves audible to the user;
   a microphone element for converting sound waves into electrical signals;
   an elongated sound boom connected to said housing and extending towards the mouth of the user;
   wire means providing discrete connections between the communications device and the microphone and receiver elements respectively;
   support means for holding said housing in a selected position relative to the head of the user, with the support means being defined by a U-shaped wire band connected to the housing and having dimensions substantially corresponding to the user's head; and
   cushion means affixed to the end of the housing having the sound port and configured to rest against the user's ear, said cushion means including a channel aligned with said sound port, said cushion means further including an elongated hollow plug mounted in said channel for transmitting sound directly to the user's ear, *and wherein said cushion means is configured to prevent said hollow plug from penetrating the auditory canal of the user.*

* * * * *